United States Patent
Zhang

(10) Patent No.: US 11,975,452 B2
(45) Date of Patent: May 7, 2024

(54) MOTION CONTROL METHOD, DEVICE AND SYSTEM, AND STORAGE MEDIUM

(71) Applicant: MegaRobo Technologies Co., Ltd., Beijing (CN)

(72) Inventor: Yan Zhang, Beijing (CN)

(73) Assignee: MegaRobo Technologies Co., Ltd., Beijing (CN)

( * ) Notice: Subject to any disclaimer, the term of this patent is extended or adjusted under 35 U.S.C. 154(b) by 401 days.

(21) Appl. No.: 17/424,477

(22) PCT Filed: Dec. 16, 2019

(86) PCT No.: PCT/CN2019/125690
§ 371 (c)(1),
(2) Date: Jul. 20, 2021

(87) PCT Pub. No.: WO2020/151406
PCT Pub. Date: Jul. 30, 2020

(65) Prior Publication Data
US 2022/0072701 A1    Mar. 10, 2022

(30) Foreign Application Priority Data
Jan. 21, 2019   (CN) .......................... 201910055381.6

(51) Int. Cl.
B25J 9/16          (2006.01)
G05B 19/404     (2006.01)

(52) U.S. Cl.
CPC .......... *B25J 9/1641* (2013.01); *G05B 19/404* (2013.01); *G05B 2219/33116* (2013.01); *G05B 2219/41032* (2013.01); *G05B 2219/41082* (2013.01)

(58) Field of Classification Search
CPC ...... B25J 9/1641; B25J 9/1602; B25J 9/1664; G05B 19/404; G05B 2219/33116
See application file for complete search history.

(56) References Cited

U.S. PATENT DOCUMENTS 6,566,835 B1 *   5/2003   Yoshida ............... G05B 19/404
                                                                    318/632
9,381,643 B2 *   7/2016   Hoffmann ............... A61B 34/30
(Continued)

FOREIGN PATENT DOCUMENTS

CN         101909829 A       12/2010
CN         103197673 A         7/2013
(Continued)

OTHER PUBLICATIONS

Chinese Office Action dated Mar. 20, 2020 in connection with Chinese Application No. 201910055381.6.
(Continued)

*Primary Examiner* — Jonathan L Sample
*Assistant Examiner* — Mohammed Yousef Abuelhawa
(74) *Attorney, Agent, or Firm* — Wolf, Greenfield & Sacks, P.C.

(57) ABSTRACT

A motion control method is provided. The motion control method comprises: obtaining a sequence of motion parameters of a joint; interpolating the sequence of motion parameters to obtain an interpolation parameter sequence; and calculating driving parameters of a motion component based on the interpolation parameter sequence to drive the motion component to move. According to the motion control method, only a few of motion parameters need to be set by a user, and a lot of motion parameters can be obtained by interpolation, which make it possible for a motor or a robot to achieve smooth operation while a workload for the user is kept to be lower. A motion control device, system, and storage medium are also provided.

20 Claims, 5 Drawing Sheets

(56) References Cited

U.S. PATENT DOCUMENTS

| | | | | |
|---|---|---|---|---|
| 2003/0205984 | A1* | 11/2003 | Yoshida | ............... G05B 19/404 |
| | | | | 318/801 |
| 2007/0146371 | A1* | 6/2007 | Dariush | ................. G06T 7/251 |
| | | | | 345/473 |
| 2007/0255454 | A1 | 11/2007 | Dariush | |
| 2018/0281173 | A1* | 10/2018 | Hane | ........................ B25J 9/161 |
| 2020/0055192 | A1* | 2/2020 | Ju | ......................... B25J 9/1602 |

FOREIGN PATENT DOCUMENTS

| | | |
|---|---|---|
| CN | 103429397 A | 12/2013 |
| CN | 103823467 A | 5/2014 |
| CN | 104254430 A | 12/2014 |
| CN | 104647387 A | 5/2015 |
| CN | 105278462 A | 1/2016 |
| CN | 105652801 A | 6/2016 |
| CN | 106625015 A | 5/2017 |
| CN | 106814694 A | 6/2017 |
| CN | 106903690 A | 6/2017 |
| CN | 108213696 A | 6/2018 |
| CN | 108858205 A | 11/2018 |
| CN | 109176526 A | 1/2019 |
| CN | 109551485 A | 4/2019 |
| JP | 2004-322224 A | 11/2004 |
| JP | 2014-208400 A | 11/2014 |
| JP | 2015-066668 A | 4/2015 |

OTHER PUBLICATIONS

International Search Report dated Mar. 13, 2020 in connection with International Application No. PCT/CN2019/125690.

\* cited by examiner

MOTION CONTROL METHOD, DEVICE AND SYSTEM, AND STORAGE MEDIUM

CROSS-REFERENCE TO RELATED APPLICATIONS

This application is a 35 U.S.C. § 371 National Phase filing of International Application No. PCT/CN2019/125690, filed on Dec. 16, 2019, entitled "MOTION CONTROL METHOD, APPARATUS AND SYSTEM, AND STORAGE MEDIUM," which claims priority to and the benefit of Chinese Patent Application No. 201910055381.6, filed on Jan. 21, 2019. The entire contents of these applications are incorporated herein by reference in their entirety.

TECHNICAL FIELD

The present invention relates to the technical field of motion control, in particular to a motion control method, device and system, and a storage medium.

BACKGROUND

In a motion control system based on a robot (for example, a mechanical arm) and other similar technologies, a connection relation is established between an apparatus (for example, the robot or a drive controller, etc.) to be controlled and a robot control apparatus (for example, an upper computer, etc.), and then a user may control the motion of the robot by means of the robot control apparatus.

Typically, the user may edit motion parameters of each joint to control motion of the robot. In this way, whether the motion parameters set by the user on the robot control apparatus are appropriate may greatly affect running stability of a motor (or the robot).

For example, if motion parameters are set to be too few for a same action, acceleration and deceleration in motion of a motor may be particularly great. The impact on the motor, a speed reducer, etc. may be great, the motion process may be unstable, and the phenomena of jamming, abnormal sound, etc. are likely to occur. In order to solve these problems, more motion parameters need to be set, which is difficult for a user to complete. It is time-consuming, labor-consuming, and error-prone. In addition, its requirements for communication and calculating capability of a motion control component (for example, a drive controller) are also particularly high, which is difficult to achieve.

Accordingly, how to provide a motion control solution which is simple and easy for the user and enables the motor (or the robot) to run smoothly is always a problem troubling those skilled in the art.

BRIEF SUMMARY

Embodiments of the present invention are provided in consideration of the above-mentioned problems. The embodiments of the present invention provide a motion control method, device, system and storage medium.

A motion control method is provided according to an aspect of the invention. The motion control method comprises: obtaining a sequence of motion parameters of a joint; interpolating the sequence of motion parameters to obtain an interpolation parameter sequence; and calculating driving parameters of a motion component based on the interpolation parameter sequence to drive the motion component to move.

Exemplarily, the interpolating the sequence of motion parameters to obtain an interpolation parameter sequence comprises: firstly interpolating the motion parameters by using a robot control apparatus to obtain a rough interpolation parameter sequence; and secondly interpolating the rough interpolation parameter sequence by using a motion control component to obtain the interpolation parameter sequence.

Exemplarily, before the secondly interpolating the rough interpolation parameter sequence by using a motion control component, the method further comprises: detecting whether a first reversing set exists in the rough interpolation parameter sequence, each first reversing set comprising three groups of rough interpolation motion parameters with adjacent time data for reversing the motion component; and if at least one first reversing set is detected, for each of the at least one first reversing set, inserting at least one group of first reversing motion parameters into the first reversing set to obtain a new rough interpolation parameter sequence, wherein the at least one group of first reversing motion parameters is used for indicating that a backlash is passed during reversal of the motion component within a preset time.

Exemplarily, each of the at least one first reversing set comprises a first group of motion parameters (P1, V1, T1), a second group of motion parameters (P2, V2, T2) and a third group of motion parameters (P3, V3, T3) arranged by time data from smallest to largest, and an inserted group of first reversing motion parameters is (P4, V4, T4);
if P2−P1>0 and P3−P2<0, then:
P4=P2−360°/an encoder resolution,
V4=a first preset speed, and
T4=T2+a first preset time; and
if P2−P1<0 and P3−P2>0, then:
P4=P2+360°/the encoder resolution,
V4=a second preset speed, and
T4=T2+a second preset time; and
wherein P1, P2, P3 and P4 are position data, V1, V2, V3 and V4 are speed data, and T1, T2, T3 and T4 are time data.

Exemplarily, before the secondly interpolating the rough interpolation parameter sequence by using a motion control component, the method further comprises: step a: reserving a first group of rough interpolation motion parameters, in the rough interpolation parameter sequence arranged by time data from smallest to largest, as a current group of valid motion parameters; step b: for an (x+i)th group of rough interpolation motion parameters located after the current group of valid motion parameters in the rough interpolation parameter sequence arranged by time data from smallest to largest, calculating a difference between position data in the (x+i)th group of rough interpolation motion parameters and position data in the current group of valid motion parameters in sequence until an end-point group of rough interpolation motion parameters is found, a difference between position data in the end-point group of rough interpolation motion parameters and the position data in the current group of valid motion parameters being larger than a preset threshold, wherein x is a serial number of the current group of valid motion parameters in the rough interpolation parameter sequence, i=1, 2, 3 ... m, m≤$N_{1-x}$, and $N_1$ is the total number of groups of rough interpolation motion parameters in the rough interpolation parameter sequence; step c: deleting a group of rough interpolation motion parameters between the current group of valid motion parameters and the end-point group of rough interpolation motion parameters, reserving the end-point group of rough interpolation motion parameters as a current group of valid motion parameters, and returning to the step b; and step d: determining all reserved groups of valid motion parameters as a new rough interpolation parameter sequence.

Exemplarily, wherein before the secondly interpolating the rough interpolation parameter sequence by using a motion control component, the method further comprises: detecting whether a second reversing set exists in the rough interpolation parameter sequence, each second reversing set comprising two groups of rough interpolation motion parameters with adjacent time data and opposite speed data; and if at least one second reversing set is detected, for each of the at least one second reversing set, inserting at least one group of second reversing motion parameters into the second reversing set to obtain a new rough interpolation parameter sequence, wherein speed data in the group of second reversing motion parameters equals 0.

Exemplarily, the secondly interpolating the rough interpolation parameter sequence by using a motion control component to obtain the interpolation parameter sequence comprises: secondly interpolating the rough interpolation parameter sequence by using the motion control component to make the interpolation parameter sequence contain an interpolation motion parameter corresponding to each microstep of the motion component.

Exemplarily, before calculating driving parameters of a motion component based on the interpolation parameter sequence, the method further comprises: detecting whether a third reversing set exists in the interpolation parameter sequence, each third reversing set comprising three groups of interpolation motion parameters with adjacent time data for reversing the motion component; and if at least one third reversing set is detected, for each of the at least one third reversing set, inserting at least one group of third reversing motion parameters into the third reversing set to obtain a new interpolation parameter sequence, wherein the at least one group of third reversing motion parameters is used for indicating that a backlash is passed during reversal of the motion component within a preset time.

Exemplarily, before calculating driving parameters of a motion component based on the interpolation parameter sequence, the method further comprises: step a: reserving a first group of interpolation motion parameters, in the interpolation parameter sequence arranged by time data from smallest to largest, as current group of valid motion parameters; step b: for a (y+j)th group of interpolation motion parameters located after the current group of valid motion parameters in the interpolation parameter sequence arranged by time data from smallest to largest, calculating a difference between position data in the (y+j)th group of interpolation motion parameters and position data in the current group of valid motion parameters in sequence until an end-point group of interpolation motion parameters is found, a difference between position data in the end-point group of interpolation motion parameters and the position data in the current group of valid motion parameters being larger than a preset threshold, wherein y is a serial number of the current group of valid motion parameters in the interpolation parameter sequence, $j=1, 2, 3 \ldots k$, $k \leq N_{2-x}$, and $N_2$ is the total number of groups of interpolation motion parameters in the interpolation parameter sequence; step c: deleting a group of interpolation motion parameters between the current group of valid motion parameters and the end-point group of interpolation motion parameters, reserving the end-point group of interpolation motion parameters as a current group of valid motion parameters, and returning to the step b; and step d: determining all reserved groups of valid motion parameters as a new interpolation parameter sequence.

Exemplarily, before calculating driving parameters of a motion component based on the interpolation parameter sequence, the method further comprises: detecting whether a fourth reversing set exists in the interpolation parameter sequence, each fourth reversing set comprising two groups of interpolation motion parameters with adjacent time data and opposite speed data; and if at least one fourth reversing set is detected, for each of the at least one fourth reversing set, inserting at least one group of fourth reversing motion parameters into the fourth reversing set to obtain a new interpolation parameter sequence, wherein speed data in the group of fourth reversing motion parameters equals 0.

Exemplarily, the interpolating the sequence of motion parameters is achieved by using one or more of following interpolation modes: trapezoidal curve interpolation, S-shaped curve interpolation, cubic polynomial curve interpolation, quintic polynomial curve interpolation, and linear interpolation.

Exemplarily, the motion control method further comprises: receiving an interpolation instruction which is input by a user and is used for instructing an interpolation mode; and the interpolating the sequence of motion parameters to obtain an interpolation parameter sequence comprises: interpolating the sequence of motion parameters in the interpolation mode instructed by the interpolation instruction to obtain the interpolation parameter sequence.

Exemplarily, calculating driving parameters of a motion component based on the interpolation parameter sequence is started when the number of groups in the interpolation parameter sequence reaches a preset number.

A motion control device is provided according to another aspect of the invention. The motion control device comprises: an obtaining module, configured to obtain a sequence of motion parameters of a joint; an interpolation module, configured to interpolate the sequence of motion parameters to obtain an interpolation parameter sequence; and a calculating module, configured to calculate driving parameters of a motion component based on the interpolation parameter sequence to drive the motion component to move.

A motion control system is provided according to yet another aspect of the invention. The motion control system comprises a processor and a memory, wherein the memory stores computer program instructions which are configured to perform, when run by the processor, the above motion control methods.

A storage medium is provided according to yet another aspect of the invention. The storage medium stores program instructions which are configured to perform, when running, the above motion control methods.

According to the motion control method, device, system, and storage medium of the embodiments of the present invention, only a few of motion parameters need to be set by the user, and a lot of motion parameters can be obtained by interpolation, which make it possible for a motor or a robot to achieve smooth operation while a workload for the user is kept to be lower.

BRIEF DESCRIPTION OF THE DRAWINGS

The above and other objects, features, and advantages of the present invention will become more apparent from more detailed description of embodiments of the present invention in conjunction with the accompanying drawings. The accompanying drawings serve to provide a further understanding of the embodiments of the present invention, constitute a part of the specification, serve to explain the present invention, together with the embodiments of the present

DETAILED DESCRIPTION OF THE DISCLOSURE

Figure 1:
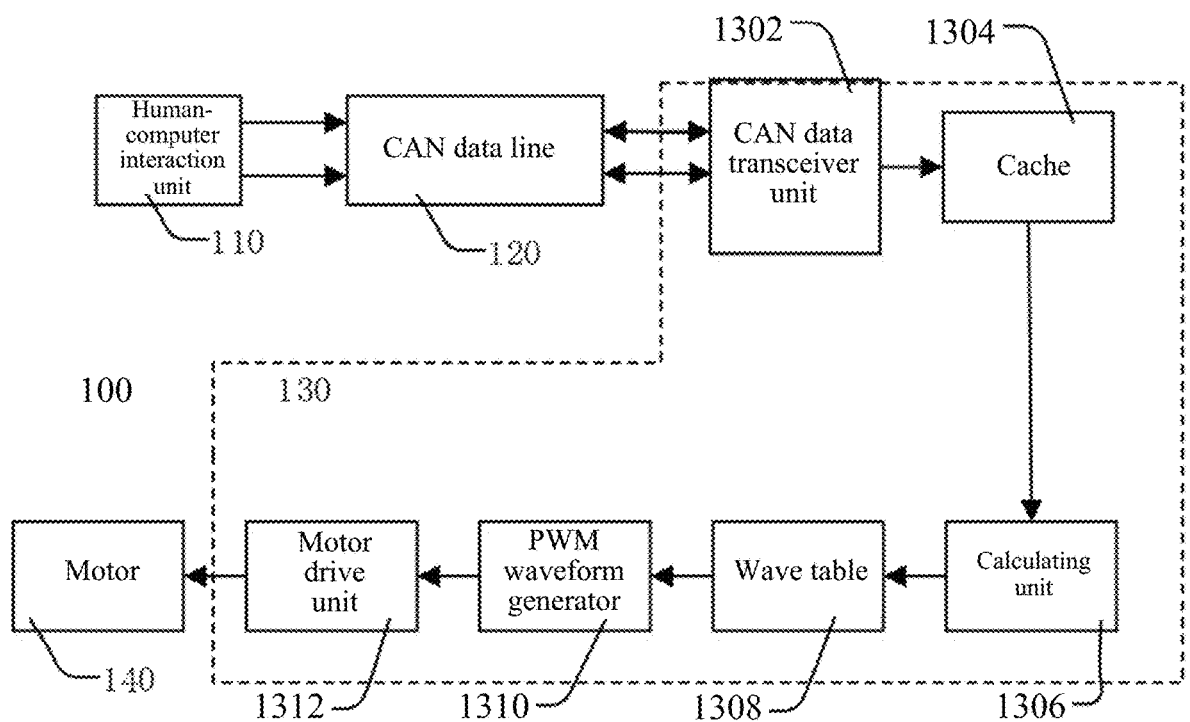
FIG. 1 shows a schematic block diagram of a motion control system according to an embodiment of the present invention.

For making objectives, technical solutions and advantages of the present invention more apparent, exemplary embodiments according to the present invention will be described in detail below with reference to the accompanying drawings. Obviously, the described embodiments are only parts of instead all embodiments of the present invention, and it is to be understood that the present invention is not limited by the exemplary embodiments described herein. Based on the embodiments of the present invention described herein, all other embodiments obtained by those skilled in the art without inventive steps should fall within the scope of the protection of the present invention.

As described above, existing motion control systems face the difficulty in parameter setting. For a same action, if number of motion parameters is set too small, for example, the action is accomplished according to 50 rows of PVT parameters, acceleration and deceleration in motion of a motor may be particularly great. The impact on the motor, a speed reducer, etc. may be great, the motion process may be unstable, and the phenomena of jamming, abnormal sound, etc. are likely to occur. In order to solve these problems, more motion parameters need to be set, which may be more than ten thousands of rows of PVT parameters. It is difficult for a user to complete, and it is time-consuming, labor-consuming, and error-prone. Its requirements for communication and calculating capability of a motion control component (for example, a drive controller) are also particularly high, which is difficult to achieve.

For solving the above setting problem of the motion parameters, the embodiment of the present invention provides a motion control method. According to the motion control method, interpolation may be automatically performed on the motion parameters initially set by the user, such that the motor or the robot may run stably while workload of the user is kept low. The motion control method provided by the embodiment of the present invention may be applied to the control field of any robot or apparatuses in an operation mode similar to that of the robot.

The motion control method provided by the embodiment of the present invention may be applied to a motion control system. The motion control system described herein may include a robot control apparatus and an apparatus to be controlled. The robot control apparatus may include, for example, an upper computer, a teach pendant, etc. The apparatus to be controlled may include, for example, a robot, a drive controller for driving the robot to move, etc. Further, the motion control component described herein may include a driver, and the motion component may include a motor.

The robot described herein may be a mechanical device that performs an operation automatically. The robot may include a robot body and an end-effector (or referred to as a tool). The body may include a plurality of joints, for example, a base, an upper arm, a forearm, a wrist, etc. The end-effector is, for example, a clamping jaw or an object clamping part capable of being opened and closed, and may also be other operation tools. The end-effector is controlled by the robot control apparatus to move according to a corresponding route and complete a preset action. Specifically, for example, the end-effector is manipulated by the robot control apparatus to move in a three-dimensional space and perform related actions at specified positions, for example, grasping, releasing, or other actions.

Taking a gear motor as an example, the gear motor is a main motion execution component of a mechanical arm (or called a manipulator, a multi-axis robot, a multi-joint robot, etc.). The mechanical arm mainly clamps a target object from an initial position to a target position according to a preset route, which is suitable for mechanical automation in various industrial fields.

Mechanical arms on the market at present mainly include a four-axis robot (with four joints) and a six-axis robot (with six joints). Each of the four-axis robot and the six-axis robot includes a base, an arm and an object clamping part at the end. The number of the joints on the arm determines the number of axes of the robot, and each joint is driven by the rotation of one motor so as to achieve the motion of the joint.

A motion control system according to an embodiment of the present invention is described below in conjunction with FIG. 1 to help understand an exemplary application environment of a motion control method according to an embodiment of the present invention. FIG. 1 shows a schematic block diagram of a motion control system 100 according to an embodiment of the present invention. It is to be noted that the motion control method provided by the embodiment of the present invention may be implemented on other systems similar to the motion control system 100, and is not limited to the specific example shown in FIG. 1.

As shown in FIG. 1, the motion control system 100 may include a human-computer interaction unit (that is, robot control apparatus) 110, a controller area network (CAN) data line 120, a motion control component 130, and a motor (that is, motion component) 140. The motion control component 130 includes a CAN data transceiver unit 1302, a cache 1304, a calculating unit 1306, a wave table 1308, a PWM waveform generator 1310 and a motor drive unit 1312.

A user may edit a motion parameter by means of the human-computer interaction unit 110 while using the motion control component (for example, drive controller) 130 to control the motor 140. The human-computer interaction unit 110 sends the motion parameter edited by the user to the motion control component 130 via the CAN data line 120. The motion control component 130 calculates the received motion parameter to obtain wave table data and then generates a PWM waveform to drive the motor to move.

Specifically, the calculating unit 1306 in the motion control component 130 may read the motion parameter, then perform interpolation, calculating and other processing on the read motion parameter by using a calculating equation, convert the motion parameter into the wave table data, and store the wave table data in the wave table 1308.

The wave table 1308 may be implemented by a DDR memory, etc. and used for storing wave table data. The storage depth of the wave table 1308 may be set according to design requirements.

The PWM waveform generator 1310 is configured to generate corresponding PWM waveform data according to the wave table data stored in the wave table 1308. The PWM waveform may also be sometimes called a pulse waveform and has the high-level state and the low-level state. The duty ratio of the PWM waveform may be adjusted to achieve the purposes of controlling the speed of the motor, the switching state of an electromagnetic valve, etc. in the field of motion control. The PWM waveform generator 1310 may be implemented by a variety of existing PWM waveform generators, for example, a PWM waveform generator implemented based on a direct digital frequency synthesis (DDS) signal generation technology, a PWM waveform generator implemented based on a digital counting technology, etc.

Therefore, the calculating unit 1306 converts the actual motion parameters set by the user into the wave table data for generating the PWM waveform. The PWM waveform generator 1310 generates the corresponding PWM waveform data according to the wave table data. The PWM waveform data is processed by digital-to-analog conversion, amplification and filtering, etc., and then is sent to the motor drive unit 1312 to drive the motor 140 to move.

The motor drive unit 1312 is configured to drive the motor 140 to move according to the PWM waveform and may be implemented by various motor drive chips.

Figures 2, 3:
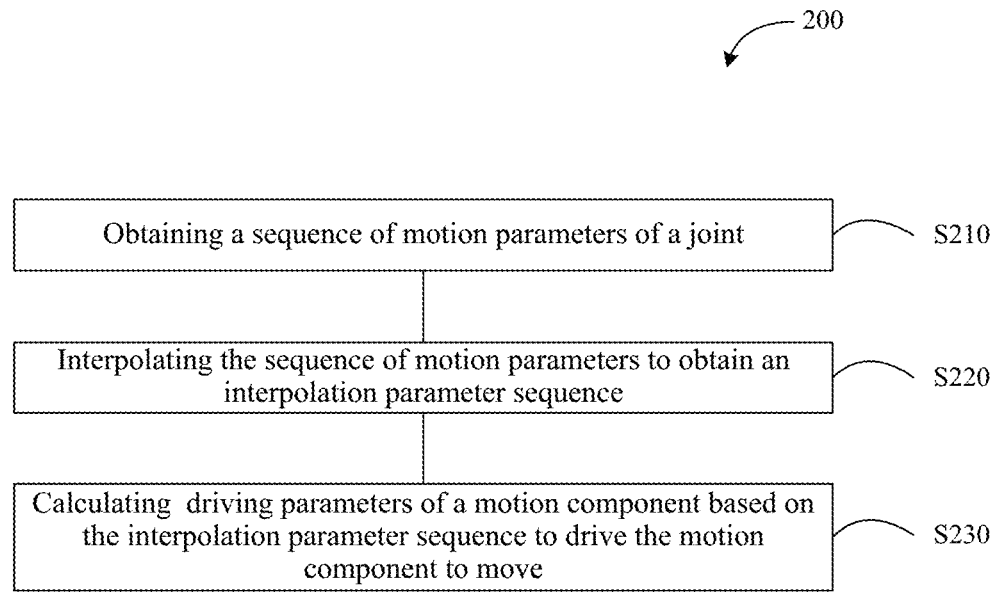
FIG. 2 shows a schematic flow chart of a motion control method according to an embodiment of the present invention.
FIG. 3 shows an example of motion parameters of a joint according to an embodiment of the present invention.

The motion control method according to an embodiment of the present invention will be described hereinafter in conjunction with FIG. 2. FIG. 2 shows a schematic flow chart of a motion control method 200 according to an embodiment of the present invention. As shown in FIG. 2, the motion control method 200 includes steps S210, S220, and S230.

In step S210, a sequence of motion parameters of a joint is obtained.

A sequence of motion parameters of a target joint may be obtained in the step S210. The target joint may be any joint of a robot. That is to say that the various steps in the motion control method 200 may be performed for any joint of the robot.

As an example instead of limitation, any joint may correspond to one or more groups of motion parameters. That is, the sequence of motion parameters described herein may include at least one group of motion parameters. The motion parameters in the sequence of motion parameters obtained in step S210 may be considered as initial motion parameters.

Optionally, motion parameters, input by a user, of the end-effector may be received, and the received motion parameters of the end-effector may be converted to motion parameters of each joint of the robot. Optionally, motion parameters, input by the user, of each joint of the robot may also be directly received. That is, the user may input the motion parameters of the end-effector, and then the motion parameters may be converted to the motion parameters of each joint by a robot control apparatus and/or a motion control component. Alternately, the user may directly input the motion parameters of each joint of the robot.

Optionally, the motion parameters in the sequence of motion parameters obtained in step S210 may be motion parameters which are initially edited by the user or further processed (for example, interpolated) by the motion control system.

The motion parameters obtained in step S210 are parameters for controlling the motion of a motion component (for example, a motor). As described above, the user may edit the motion parameters by using the human-computer interaction unit 110 and then send the motion parameters to the motion control component (for example, drive controller) 130 of the robot. The motion control component 130 may interpolate the received motion parameters and calculate based on them and then control the motion of the motion component 140.

The content of the motion parameters may vary according to the actual composition of the motion component (for example, motor). Illustratively, the motion parameters may include one or more of position data, speed data, and time data. The position data may be coordinate data in a space rectangular coordinate system, and may also be a rotation angle or other position-related data. Under the condition that the position data is the coordinate data in the spatial rectangular coordinate system, the motion parameters may be referred to as LVT parameters. Under the condition that the position data is the rotation angle, the motion parameters may be referred to as PVT parameters.

The PVT parameters are taken as an example of motion parameters for description herein. The PVT parameters may include a rotation angle (which may be referred to as P), a rotation speed (which may be referred to as V), and rotation time (which may be referred to as T). FIG. 3 shows an example of motion parameters of a joint according to an embodiment of the present invention. To accomplish a certain action, the user may edit a set of PVT parameters, for example, 4 groups of PVT parameters S1, S2, S3, S4 edited in the example shown in FIG. 3, in a motion parameter list displayed on a human-computer interaction interface of the human-computer interaction unit 110. The first group of PVT parameters may be input by the user and may also be preset by the system. The first group of PVT parameters may be defaulted as (0, 0, 0). The second group of and following groups of PVT parameters may be set by the user according to the requirements.

In step S220, the sequence of motion parameters is interpolated to obtain an interpolation parameter sequence.

As described above, to accomplish an action, the user may edit a set of PVT parameters in the motion parameter list. Then, this set of PVT parameters may be interpolated. The interpolation mode may be set by the user or in a default mode as described below.

Figure 4:
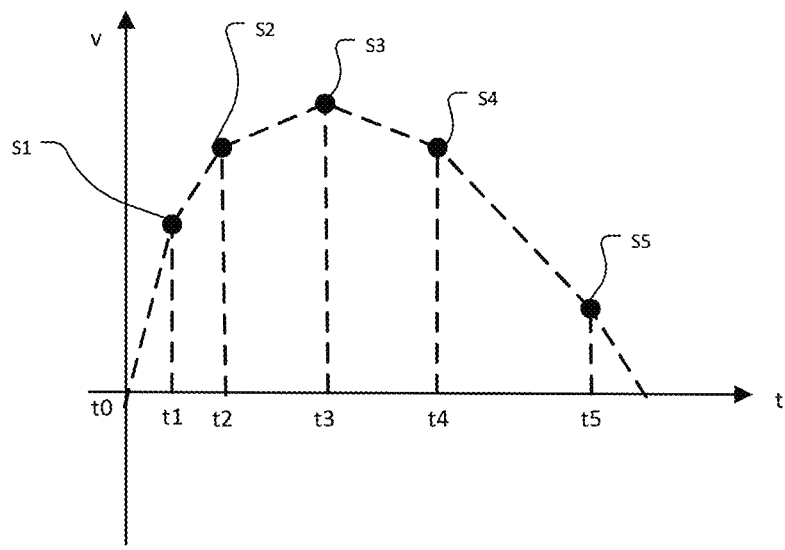
FIG. 4 shows a waveform corresponding to motion parameters edited by a user, according to an embodiment of the present invention.

FIG. 4 shows a waveform corresponding to motion parameters edited by a user, according to an embodiment of the present invention. In FIG. 4, points S1-S5 may represent 5 groups of PVT parameters edited by the user. The abscissa represents the time t, the ordinate represents the speed v, and an area of a shape defined by the speeds and times of every two points represents the rotation angle P, which constitutes the PVT parameters.

For points S1 and S2, if no interpolation is performed, a motor needs to change directly from the speed v1 to the speed v2. The change is very large, the motion of the motor is not smooth, and the middle process is not controlled. Therefore, interpolation may be performed between the point S1 and the point S2. The interpolation mode may be selected as long as the requirements that the abscissa represents the time t, the ordinate represents the speed v, and the area of the shape defined by the speeds and times of every two points represents the rotation angle P are met. For example, 4 points may be inserted between the points S1 and S2. Interpolation may be performed between every two remaining adjacent points.

In one example, an interpolation parameter sequence may be obtained by one-time interpolating the motion parameters of the joint by the robot control apparatus or the motion control component. In another example, an interpolation parameter sequence may be obtained by interpolating the motion parameters of the joint two or more times.

Illustratively, the sequence of motion parameters is interpolated to obtain the interpolation parameter sequence (step S220) may include the following steps. The motion parameters are firstly interpolated by the robot control apparatus to obtain a rough interpolation parameter sequence. The rough interpolation parameter sequence is secondly interpolated by the motion control component to obtain the interpolation parameter sequence.

The example shown in FIG. 4 is referred again below. When the interpolation is performed between the point S1 and the point S2, if the points inserted by the robot control apparatus are too many, for example, thousands of points are inserted, there will be a lot of data that needs to be transmitted between the robot control apparatus and the motion control component. The transmission is slower, and the real-time control over the motor is influenced. Accordingly, it is not suitable to insert too many points. Therefore, for ensuring the smoothness of the running of the motor or the robot and ensuring the real-time control over the motor or the robot, two times of interpolation may be separately performed at the robot control apparatus and the motion control component.

Illustratively, the number of groups of motion parameters inserted during the first interpolation may be smaller than a first group threshold, and the number of groups of motion parameters inserted during the second interpolation may be larger than a second group threshold. The first group threshold may be smaller than or much smaller than the second group threshold. That is, a smaller amount of points may be inserted on the robot control apparatus to reduce the amount of communication data so as to ensure real-time control, while a larger amount of points may be inserted on the motion control component to make the running of the motor or the robot as stable as possible. For example, during the first interpolation, a few numbers of points may be inserted between every two adjacent points, while during the second interpolation, tens or even hundreds of points may be inserted between every two adjacent points (the points adjacent to each other may be determined in all points obtained after the first interpolation). The first interpolation may be referred to as rough interpolation and the second interpolation may be referred to as fine interpolation.

The first automatic interpolation of motion parameters is performed on the robot control apparatus (for example, upper computer), and the second automatic interpolation of motion parameters is performed on the motion control component (for example, motor), which may greatly reduce the workload for editing motion parameters by the user, and meanwhile, the requirement on communication is low. After two times of interpolation, a very stable motion solution may be provided, and the motion of the motor or the robot is very smooth.

It should be noted that each group of rough interpolation motion parameters in the rough interpolation parameter sequence and each group of interpolation motion parameters in the interpolation parameter sequence, described herein, have the same form of content as each group of motion parameters (initial motion parameters) obtained in step S210. Terms, for example, an initial motion parameter, a sequence of motion parameters, a rough interpolation motion parameter, a rough interpolation parameter sequence, an interpolation motion parameter and an interpolation parameter sequence, etc. are mainly used for distinguishing the motion parameters before the first interpolation, after the first interpolation and after the second interpolation and have no special meaning.

In step S230, based on the interpolation parameter sequence, driving parameters of the motion component are calculated to drive the motion component to move. The motion component is corresponding to the target joint and may be used for driving the target joint to move.

The operation principle of the motion control component 130 to calculate based on the motion parameters and to drive the motion component to move has been described above in conjunction with FIG. 1, which will not be described in detail herein.

Figure 5:
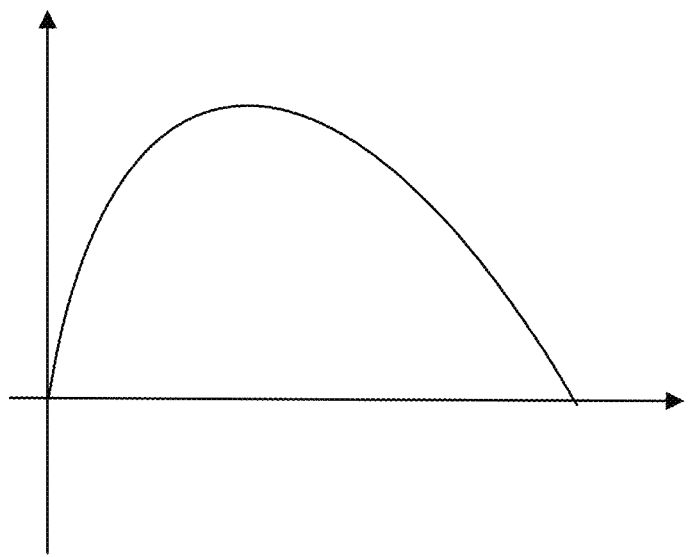
FIG. 5 shows a waveform corresponding to motion parameters obtained by interpolating the motion parameters edited by the user, according to an embodiment of the present invention.

In practical application, interpolation may be performed as required to obtain motion parameters making the running smoothness of the motor or the robot meet requirements. For example, a larger number of motion parameters may be obtained by interpolating the motion parameters shown in FIG. 4, such that a waveform corresponding to the motion parameters actually used to control the motion component may reach or approach a waveform shown in FIG. 5. FIG. 5 shows a waveform corresponding to motion parameters obtained by interpolating motion parameters edited by a user, according to an embodiment of the present invention.

It can be seen that the motion trajectory in FIG. 4 is quite stiff, and the change between all points is too large. While a motion trajectory in FIG. 5 is smoother, and there is almost no jump between all the points. The problem of impact of acceleration and deceleration in motor control on a motion control system may be effectively solved. The motion process is stable, and there is almost no vibration.

Therefore, based on the motion control solution provided by the embodiments of the present invention, the user may obtain a relatively stable motor (or robot) running result only by simply editing parameters (if teaching is performed by using a teach pendant or machine vision, etc., no parameter is required to be edited), which may greatly reduce the working complexity of the user, and be a motion control mode which is very friendly to the user.

According to the motion control method provided by the embodiments of the present invention, the user only needs to set a small number of motion parameters, and a larger number of motion parameters are obtained by means of interpolation. This method makes stable running of the motor or the robot possible while keeping user workload low.

According to an embodiment of the present invention, before the secondly interpolating the rough interpolation parameter sequence by using a motion control component, the method 200 may further include following steps. Whether a first reversing set exists in the rough interpolation parameter sequence is detected. Each first reversing set comprises three groups of rough interpolation motion parameters with adjacent time data for reversing the motion component. If at least one first reversing set is detected, for each of the at least one first reversing set, at least one group of first reversing motion parameters is inserted into the first reversing set to obtain a new rough interpolation parameter sequence, wherein the at least one group of first reversing motion parameters is used for indicating that a backlash is passed during reversal of the motion component within a preset time.

The user may edit a set of motion parameters and then can control the motion action of the robot by using the motion parameters. For example, the robot may grab a certain object from point A and then places the same at point B to achieve carry of the object.

Figure 6:
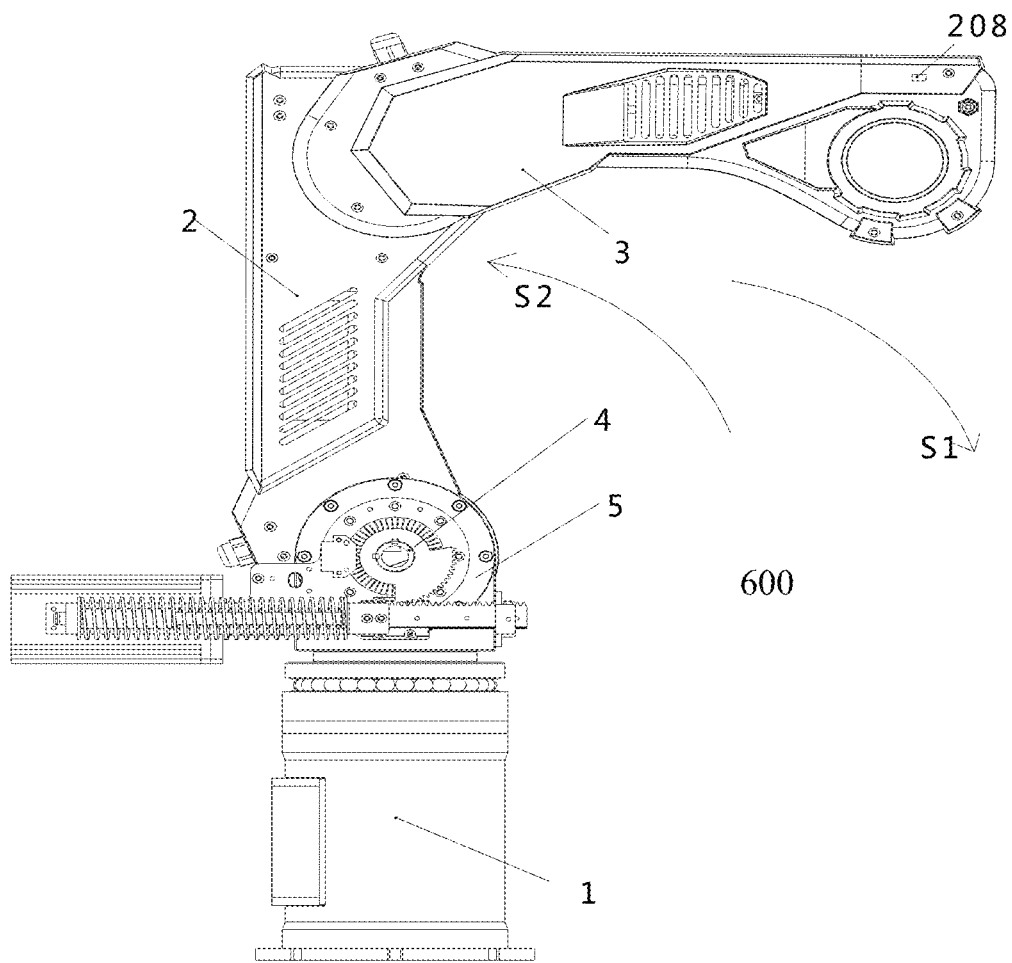
FIG. 6 shows a schematic diagram of a robot according to an example.

A certain joint of the robot may have a "reversing" action in a complete movement. The reversing action is described below in conjunction with FIG. 6. FIG. 6 shows a schematic diagram of a robot 600 according to an example. The robot 600 includes a base 1, an upper arm 2, a forearm 3, etc., wherein the upper arm 2 is driven by a motor 4 and a speed reducer 5. When the robot 600 in the FIG. 6 grabs a certain object, the upper arm 2 and the forearm 3 firstly need to move downwards in a direction S1 to grab the object, then lift upwards in a direction S2 and finally move to a position to place the object. This process of downward moving to upward lifting may be referred to as a reversing process.

The above reversing process may have the following problems. There may be a gap in a mechanical structure (a gap exists between gears of the speed reducer, etc), and the gap (which may be referred to as a backlash or a reverse clearance) may influence the precision of displacement of the motion component (for example, motor) during reversing movement, such that the robot may not reach a set position at a set speed within a set time.

For solving the problem, an embodiment of the present invention provides a backlash compensation solution. That is, motion parameters (herein referred to as first reversing motion parameters) are inserted into the reversing position, and by means of the inserted first reversing motion parameters, a motion component may pass through the backlash within a preset time (the preset time may be set as required, for example, the preset time is set as short as possible). It may ensure the precision of the displacement of the motion component, and may ensure that the robot may reach the set position at the set speed within the set time. An exemplary solution for backlash compensation is described below.

Illustratively, the detecting whether a first reversing set exists in the rough interpolation parameter sequence may include following steps.

For any three groups of motion parameters, a first group of motion parameters (P1, V1, T1), a second group of motion parameters (P2, V2, T2) and a third group of motion parameters (P3, V3, T3), which are arranged by time data from smallest to largest, with adjacent time data in the rough interpolation parameter sequence,
  if the first case of P2−P1>0 and P3−P2<0 exists, or the second case of P2−P1<0 and P3−P2>0 exists, it is determined that the three groups of motion parameters belong to the first reversing set; and
  if neither the first case nor the second case exists, it is determined that the three groups of motion parameters do not belong to the first reversing set.

After the rough interpolation parameter sequence is obtained, motion parameters in the sequence may be checked for determining whether a reversing case exists. For example, all motion parameters in the rough interpolation parameter sequence may be combined into one or more sets in the order of time data, and each set includes three groups of motion parameters with adjacent time data. It will be appreciated that herein, different sets may contain a portion of same motion parameters. For example, it is assumed that a rough interpolation parameter sequence of a target joint includes five groups of motion parameters S1, S2, S3, S4 and S5, which are arranged by time data from smallest to largest. The five groups of motion parameters may be combined into three sets in total, wherein S1, S2 and S3 may constitute a first set, S2, S3 and S4 may constitute a second set, and S3, S4 and S5 may constitute a third set. Motion parameters in each set may be analyzed for determining whether a reversing case exists. Under the condition that the sequence of motion parameters includes less than three groups of motion parameters, it may be understood that no reversal exists. Under the condition that the sequence of motion parameters includes at least three groups of motion parameters, reversal may exist.

It is preferable that when the user edits the motion parameters or the robot control apparatus receives the motion parameters, all the motion parameters are sorted in the order of time data, so that the motion parameters may be traversed directly according to the sorted order to determine whether a reversing case exists.

For convenience of description, the following will use each set including three groups of PVT parameters A (P1, V1, T1), B (P2, V2, T2), C (P3, V3, T3) as an example for description. The three groups of PVT parameters are adjacent in time, that is, T1, T2, and T3 are adjacent times.

For any set, if A→B displacement is positive (that is, P2−P1>0) and B→C displacement is negative (that is, P3−P2<0), or A→B displacement is negative (that is, P2−P1<0) and B→C displacement is positive (that is, P3−P2>0), it may be determined that reversal exists in the current set, that is, the current set is the first reversing set. If the above two cases do not exist, it may be determined that reversal does not exist in the current set, that is, the current set is not the first reversing set.

Illustratively, each of the at least one first reversing set comprises a first group of motion parameters (P1, V1, T1), a second group of motion parameters (P2, V2, T2) and a third group of motion parameters (P3, V3, T3) arranged by time data from smallest to largest, and an inserted group of first reversing motion parameters is (P4, V4, T4).
  If P2−P1>0 and P3−P2<0, then:
    P4=P2−360°/an encoder resolution,
    V4=a first preset speed, and
    T4=T2+a first preset time.
  If P2−P1<0 and P3−P2>0, then:
    P4=P2+360°/the encoder resolution,
    V4=a second preset speed,
    T4=T2+a second preset time.
  P1, P2, P3 and P4 are position data, V1, V2, V3 and V4 are speed data, and T1, T2, T3 and T4 are time data.

As described above, for any set, if A→B displacement is positive (that is, P2−P1>0) and B→C displacement is negative (that is, P3−P2<0), or A→B displacement is negative (that is, P2−P1<0) and B→C displacement is positive (that is, P3−P2>0), it may be determined that reversal exists in the current set, that is, the current set is the first reversing set. At this point, a group of PVT parameters D (P4, V4, T4) may be inserted between B and C. The PVT parameter list changes from (A, B, C) to (A, B, D, C).

Illustratively, the number of group of first reversing motion parameters inserted in each first reversing set is one. Illustratively, the time data of the first reversing motion parameters may be located between the time data of the second group of motion parameters and that of the third group of motion parameters in the first reversing set arranged by time data from smallest to largest, that is, T2<T4<T3.

Illustratively, the algorithm for D may be as follows.

If A→B displacement is positive (that is, P2−P1>0) and B→C displacement is negative (that is, P3−P2<0), then:

P4=P2−360°/an encoder resolution,

V4=a first preset speed, and

T4=T2+a first preset time.

If A→B displacement is negative (that is, P2−P1<0) and B→C displacement is positive (that is, P3−P2>0), then:

P4=P2+360°/an encoder resolution,

V4=a second preset speed, and

T4=T2+a second preset time.

Those skilled in the art may appreciate the meaning of the encoder resolution of the motion component, which is not described in detail herein. The expression "360°/an encoder resolution" may be appreciated as the displacement of a microstep of the motion component, and may also be appreciated as the displacement corresponding to the backlash. A distance between P2 and P4 corresponds to the backlash. Accordingly, P4 required to compensate for one of the backlashes in two opposite directions may be calculated based on P2.

The first preset speed, the second preset speed, the first preset time and the second preset time may be set as required, which is not limited herein. Illustratively, the first preset speed may be equal to an opposite number of the second preset speed. Illustratively, the first preset time and the second preset time may be equal. For two backlashes in opposite directions, the two backlashes have a large probability of being consistent in displacement, such that opposite speeds and equal times may be selected to pass through the two backlashes in the opposite directions. The solution is simple to implement and easy to control.

The first preset time and the second preset time may be represented by microstep values. It is more desirable that the first preset time and the second preset time may be set to be smaller, so that the motion component can pass through the backlashes as soon as possible. For example, the first preset time may be smaller than a first time threshold and the second preset time may be smaller than a second time threshold. The first time threshold and the second time threshold may be set as required.

As an example instead of limitation, the preset speed (including the first preset speed and the second preset speed) and the preset time (including the first preset time and the second preset time) may be data obtained by test in advance, which may be built into software code and may be modified by a debugger, but a common user has no authority to modify them. The preset speed and the preset time are used for making the motion component pass through the backlash at the desired speed and time (set to be a higher speed and shorter time as far as possible), so as to make the robot or the target joint of the robot reach the set position at the set speed within the set time.

The above mentioned backlash compensation operation, that is the operation of detecting whether a first reversing set exists in the rough interpolation parameter sequence and if at least one first reversing set is detected, for each of the at least one first reversing set, the operation of inserting at least one group of first reversing motion parameters into the first reversing set, may be executed by the robot control apparatus (for example, upper computer) and may also be executed by the motion control component (for example, drive controller). The robot control apparatus described herein may interact with the user and receive motion parameters and other instructions input by the user.

It is to be noted the inserting the first reversing motion parameters to obtain a new rough interpolation parameter sequence may be understood as updating motion parameters contained in the rough interpolation parameter sequence. Second interpolation may be subsequently performed on the new rough interpolation parameter sequence.

Illustratively, the backlash compensation function described above may be shown as an option on the human-computer interaction interface of the robot control apparatus, and the user may select whether to employ the function as required. If the user expects to use the backlash compensation function, he may check the option of the function and input the above preset speed and preset time (or employ the default threshold).

While the description herein illustrates that, by way of example, one group of first reversing motion parameters is inserted, this is not a limitation on the present invention. For example, two or more groups of first reversing motion parameters may be inserted into each first reversing set. All of the inserted first reversing motion parameters make the motion component pass through the backlash during reversal within the preset time.

According to the embodiments of the present invention, for the motion parameters for reversing the motion direction of the motion component, the first reversing motion parameters are inserted into the motion parameters so as to compensate the backlash. The method may reduce the influence of the backlash on the motion control so as to achieve the following technical effects.

1. The precision is ensured. It is possible to control the displacement precision of the motion component between plus 0.001° and minus 0.001°.

2. The time is ensured. The target position may be reached within the specified time. Due to the existence of the backlash, the time for the motion component to reach the target position may not be ensured. Adding reversing motion parameters makes it possible for the motion component to complete the backlash in a shorter time without affecting the total time.

3. Coordination is ensured. The robot is more coordinated when it continuously reverses and runs on the basis of the motion parameters.

According to an embodiment of the present invention, before the secondly interpolating the rough interpolation parameter sequence by using a motion control component, the method 200 may further include following steps. Step a: a first group of rough interpolation motion parameters, in the rough interpolation parameter sequence arranged by time data from smallest to largest, is reserved as a current group of valid motion parameters. Step b: for an (x+i)th group of rough interpolation motion parameters located after the current group of valid motion parameters in the rough interpolation parameter sequence arranged by time data from smallest to largest, a difference between position data in the (x+i)th group of rough interpolation motion parameters and position data in the current group of valid motion parameters is calculated in sequence until an end-point group of rough interpolation motion parameters is found. The difference between position data in the end-point group of rough interpolation motion parameters and the position data in the current group of valid motion parameters is larger than a preset threshold, wherein "x" is the serial number of the current group of valid motion parameters in the rough interpolation parameter sequence, i=1, 2, 3 . . . m, m≤$N_{1-x}$, and $N_1$ is the total number of groups of rough interpolation motion parameters in the rough interpolation parameter sequence. Step c: a group of rough interpolation motion parameters between the current group of valid motion parameters and the end-point group of rough interpolation motion parameters is deleted, the end-point group of rough interpolation motion parameters is reserved as a current group of valid motion parameters, and the step b is returned. Step d: all reserved groups of valid motion parameters are determined as a new rough interpolation parameter sequence.

It will be appreciated that the (x+m)th group of rough interpolation motion parameters is an end-point group of rough interpolation motion parameters.

The value of the preset threshold may be set as required, which is not limited herein. The preset threshold may be input by the user and may also be a default threshold. Illustratively, the preset threshold may be 5 degree.

After the rough interpolation parameter sequence is obtained, some optimizations may be performed on the rough interpolation parameter sequence. For example, if the difference between position data in two groups of motion parameters is small, one group of motion parameters may be deleted to reduce data redundancy. The optimization function may be shown as an option on the human-computer interaction interface of the robot control apparatus, and the user may select whether to employ the optimization function as required. If the user needs to use the parameter optimization function, he may check the option of the optimization function and input the above preset threshold (or employ the default threshold).

The above mentioned optimization function is used for traversing the PVT parameters in the rough interpolation parameter sequence. For each group of PVT parameters, the position data in the PVT parameters is compared with the position data in the first group of PVT parameters immediately following the PVT parameters in time data. If the absolute value of the difference between the two position data is smaller than the preset threshold, the PVT parameters with later time data may be deleted from the rough interpolation parameter sequence, and at the moment, an updated rough interpolation parameter sequence may be obtained. After a new rough interpolation parameter sequence is obtained each time, the optimization may be performed again until a difference between the position data in every two motion parameters with adjacent time data in the finally obtained rough interpolation parameter sequence is larger than the preset threshold.

Taking a forearm joint as an example, it is assumed that a preset threshold is set to 2 degree. Firstly, rough interpolation motion parameters in a rough interpolation parameter sequence may be arranged by time data from smallest to largest. Then from the beginning, a first group of PVT parameters is compared with a second group of PVT parameters, and if the absolute value of the difference between position data in the two groups of PVT parameters is smaller than 2 degree, the second group of PVT parameters may be considered to be invalid and deleted. Continuously, position data in a third group of PVT parameters is compared with the position data in the first group of PVT parameters, and if the absolute value of the difference is larger than 2 degree, the third group of PVT parameters may be considered to be valid and reserved. For example, the first group of PVT parameters and the third group of PVT parameters may be stored in a valid PVT sequence. Moreover, the third group of PVT parameters may serve as a group of PVT parameters participating in comparison currently (that are, current valid motion parameters). Continuously, a fourth group of PVT parameters is compared with the third group of PVT parameters, and if the absolute value of the difference is smaller than 2 degree, the fourth group of PVT parameters is considered to be invalid and deleted. Subsequently, a fifth group of PVT parameters is continuously compared with the third group of PVT parameters, and if the absolute value of the difference is still smaller than 2 degree, the fifth group of PVT parameters is considered to be invalid and deleted. Subsequently, a sixth group of PVT parameters is continuously compared with the third group of PVT parameters, and if the absolute value of the difference is larger than 2 degree, the sixth group of PVT parameters may be considered to be valid, be reserved, and be stored in the valid PVT sequence. In a similar fashion, all valid PVT parameters may be sequentially stored and/or output to the motion control component. The stored or output valid PVT parameters may form an updated rough interpolation parameter sequence.

Motion parameters which are initially edited by the user or further processed by the system may be not simplified enough (for example, the number thereof is too large), and the motion parameters need to be transmitted (for example, downloaded to the motion control component from the robot control apparatus), calculated, etc. in the motion control system, which may increase the requirement for the communication and calculating capacity of the motion control system, that is, increase the operation pressure of the motion control system.

According to the above method, the redundant motion parameters may be detected and deleted according to the position data in the motion parameters, so that the current motion parameters may be simplified, which can be beneficial to reduce the operation pressure of the motion control system, and further beneficial to shorten the response time of motion control. For example, the method is beneficial to reduce the download time of the motion parameters from the robot control apparatus to the motion control component, reduce the communication pressure, and reduce the calculating pressure of the motion control component on the motion parameters.

According to an embodiment of the present invention, before the secondly interpolating the rough interpolation parameter sequence by using a motion control component, the method 200 may further include following steps. Whether a second reversing set exists in the rough interpolation parameter sequence is detected. Each second reversing set comprises two groups of rough interpolation motion parameters with adjacent time data and opposite speed data. If at least one second reversing set is detected, for each of the at least one second reversing set, at least one group of second reversing motion parameters is inserted into the second reversing set to obtain a new rough interpolation parameter sequence, wherein speed data in the group of second reversing motion parameters equals 0, and time data in the group of second reversing motion parameters is located between time data in two groups of rough interpolation motion parameters in the second reversing set into which the group of second reversing motion parameters is inserted.

PVT parameters of all joints may be detected, and whether speed directions of previous PVT parameters and later PVT parameters are opposite is determined. If yes, PVT parameters with the speed being 0 may be inserted between the two PVT parameters. If the speed is suddenly reversed during running, the robot may have problems such as suddenly stop, uncoordinated movement, etc. The PVT parameters with the speed being 0 may be added at the reversing position, and the motor may stop and then move oppositely, which may optimize the running of the motor.

After the rough interpolation parameter sequence is obtained, motion parameters in the sequence may be checked for determining whether a speed opposite case exists. For example, all motion parameters in the rough interpolation parameter sequence may be combined into one or more sets in the order of time data, and each set may include two groups of motion parameters with adjacent time data. It will be appreciated that herein, different sets may contain a portion of identical motion parameters. For example, assuming that a rough interpolation parameter sequence of a target joint includes five groups of motion parameters S1, S2, S3, S4 and S5, which are arranged by time data from smallest to largest. The five groups of motion parameters may be combined into four sets in total, wherein S1 and S2 may constitute a first set, S2 and S3 may constitute a second set, S3 and S4 may constitute a third set, and S4 and S5 may constitute a fourth set. Motion parameters in each set may be analyzed for determining whether a speed opposite case exists. Under the condition that the rough interpolation parameter sequence includes less than two groups of motion parameters, it may be understood that no speed opposite case exists. Under the condition that the rough interpolation parameter sequence includes at least two groups of motion parameters, a speed opposite case may exist.

It is preferable that when the user edits the motion parameters or the robot control apparatus receives the motion parameters, all the motion parameters are sorted in the order of time data, so that the motion parameters may be traversed directly according to the sorted order to determine whether a speed opposite case exists.

The calculation methods of various data in the inserted group of second reversing motion parameters are described below.

For example, it is assumed that there are two groups of PVT parameters (P1, V1, T1) and (P2, V2, T2) in the rough interpolation parameter sequence, as follows:

P1: 180 V1: 2 T1: 1.2;

P2: 179 V2: −1 T2: 1.3.

Since the speeds in the first group of PVT parameters and the second group of PVT parameters are opposite, there is a speed opposite case. A third group of PVT parameters (P3, V3, T3) may be inserted therebetween, and the speed V3 in the PVT parameters equals 0.

In an example, P3 and T3 may be determined according to a speed change ratio. For example, T3 and P3 may be calculated according to the following formula.

$$sca = \left|\frac{V1}{V2-V1}\right|;$$

$$T3 = T2 \times sca + (1-sca) \times T1;$$

$$P3 = P1 + 0.5 \times sca \times (T2-T1) \times V1.$$

"sca" is the speed change ratio.

The data of the two groups of PVT parameters (P1, V1, T1) and (P2, V2, T2) are substituted into the above formulas, then sca=2/3, T3=1.2667 and P3=180.0667 may be calculated. As shown in the following table:

| P1: 180 | V1: 2 | T1: 1.2 |
| P3: 180.0667 | V3: 0 | T3: 1.2667 |
| P2: 179 | V2: −1 | T2: 1.3 |

The method of calculating time data and position data in the second reversing motion parameters is not limited to the methods described herein and the data may be calculated in other suitable methods. For example, the method of calculating time data and position data in the second reversing motion parameters may be determined according to the interpolation mode. The above formulas illustrate the calculation method of time data and position data under the condition of linear interpolation.

While the description herein illustrates that, by way of example, one group of second reversing motion parameters is inserted, this is not a limitation on the present invention. For example, two or more groups of second reversing motion parameters may be inserted into each second reversing set. Each inserted group of second reversing motion parameters satisfies the following conditions: speed data in the second reversing motion parameters equals 0, and time data in the second reversing motion parameters is located between time data of two groups of motion parameters in the second reversing set into which the second reversing motion parameters are inserted.

According to an embodiment of the present invention, the secondly interpolating the rough interpolation parameter sequence by using a motion control component to obtain the interpolation parameter sequence may include: secondly interpolating the rough interpolation parameter sequence by using the motion control component to make the interpolation parameter sequence contain an interpolation motion parameter corresponding to each microstep of the motion component.

During the second interpolation, the number of the groups of motion parameters obtained after the interpolation may meet the following requirements: every two groups of adjacent interpolated PVT parameters correspond to each microstep of rotation of the motor. For example, a certain joint of a robot includes an motor combined with a speed reducer. The joint rotating by one circle (360°) corresponds to an output shaft of the speed reducer rotating by one circle (360°), or the corresponding motor rotating by one circle multiplied by a reduction ratio of the speed reducer. The number of the microsteps may be represented as (A*B*C)/D*E, wherein A is a fixed value, B is an motor subdivision parameter, C is the reduction ratio of the speed reducer, D is 360°, and E is an angle of rotation of the joint, for example, 360°.

For example, A is a fixed parameter 300, B is an motor subdivision parameter 64 (which is settable), and C is a reduction ratio 50 (which is also settable) of the speed reducer. Then the number of the microsteps, corresponding to one circle by which the joint rotates (that is, one circle by which the output shaft of the speed reducer rotates), of the motor is 300*64*50=960000. During the second interpolation, the number of the groups of PVT parameters which may be inserted between any two groups of PVT parameters with adjacent time data is an angle M of rotation of the joint driven by the two groups of PVT parameters, divided by 360° and then multiplied by 960000, which is (M*960000)/360°.

By means of the above method, in the finally obtained interpolation parameter sequence, any two groups of motion parameters with adjacent time data may drive the joint to rotate by an angle of one microstep.

From the above introduction, it can be seen that after two times of interpolation, the control over the motor can reach the microstep level, that is, the frequency conversion can be realized at each step, which can provide smoother motion output.

According to embodiments of the present invention, the interpolating the sequence of motion parameters may be achieved by using one or more of the following interpolation modes: trapezoidal curve interpolation, S-shaped curve interpolation, cubic polynomial curve interpolation, quintic polynomial curve interpolation, and linear interpolation.

The first interpolation and the second interpolation may be realized by using one of the above interpolation modes. The first interpolation and the second interpolation may use the same interpolation mode, and may also use different interpolation modes.

According to an embodiment of the present invention, the motion control method 200 may further include: receiving an interpolation instruction input by a user and used for instructing an interpolation mode. The interpolating the sequence of motion parameters to obtain an interpolation parameter sequence includes: interpolating the sequence of motion parameters in the interpolation mode instructed by the interpolation instruction to obtain the interpolation parameter sequence.

At any time, for example, before or after PVT parameters are edited, the user may select an "interpolation mode" in an option box. The interpolation mode may be trapezoidal curve interpolation, S-shaped curve interpolation, cubic polynomial curve interpolation, quintic polynomial curve interpolation, linear interpolation, etc. After the robot control apparatus (for example, upper computer, etc.) receives selection information (that is, the interpolation instruction) about a certain interpolation mode from the user, interpolation may be carried out in the corresponding interpolation mode. Under the condition that two or more times of interpolation are performed, the user may select an interpolation mode for at least one interpolation operation. For example, for the condition that two times of interpolation, that is, first interpolation and second interpolation, are performed described above, the user may specify a first interpolation mode and a second interpolation mode for the two times of interpolation separately. The interpolation operation for which the user does not select an interpolation mode may be in a default interpolation mode. Of course, the interpolation operation performed in step S220 may not need the user to select an interpolation mode, that is, one or more times of interpolation may be performed directly in a default interpolation mode.

Illustratively, the user may be provided with options of a plurality of automatic interpolation modes for the user to select independently, which can meet different requirements of the user.

According to an embodiment of the present invention, calculating driving parameters of a motion component based on the interpolation parameter sequence may be started when the number of groups in the interpolation parameter sequence reaches a preset number.

The preset number may be any suitable number and may be set as required, which is not limited herein. Illustratively, when the number of the groups of PVT parameters obtained by interpolation reaches 10, the motor may be controlled to move in real time based on the interpolation motion parameters currently obtained. In this way, better real-time control can be obtained.

According to an embodiment of the present invention, before calculating driving parameters of a motion component based on the interpolation parameter sequence (step S230), the method 200 may further include following steps. Whether a third reversing set exists in the interpolation parameter sequence is detected, wherein each third reversing set includes three groups of interpolation motion parameters with adjacent time data for reversing the motion component. If at least one third reversing set is detected, for each of the at least one third reversing set, at least one group of third reversing motion parameters is inserted into the third reversing set to obtain a new interpolation parameter sequence, wherein the at least one group of third reversing motion parameters is used for indicating that a backlash is passed during reversal of the motion component within a preset time. Illustratively, the time data in the third reversing motion parameters may be located between the time data of the second group of motion parameters and that of the third group of motion parameters in the third reversing set arranged by time data from smallest to largest.

According to an embodiment of the present invention, each of the at least one third reversing set comprises a first group of motion parameters (P1, V1, T1), a second group of motion parameters (P2, V2, T2) and a third group of motion parameters (P3, V3, T3) arranged by time data from smallest to largest, and an inserted group of third reversing motion parameters is (P4, V4, T4).

If P2−P1>0 and P3−P2<0, then:
P4=P2−360°/an encoder resolution,
V4=a third preset speed, and
T4=T2+a third preset time.
If P2−P1<0 and P3−P2>0, then:
P4=P2+360°/the encoder resolution,
V4=a fourth preset speed, and
T4=T2+a fourth preset time.
P1, P2, P3 and P4 are position data, V1, V2, V3 and V4 are speed data, and T1, T2, T3 and T4 are time data.

According to an embodiment of the present invention, before calculating driving parameters of a motion component based on the interpolation parameter sequence (step S230), the method 200 further includes following steps. Step a: a first group of interpolation motion parameters, in the interpolation parameter sequence arranged by time data from smallest to largest, is reserved as a current group of valid motion parameters. Step b: for a (y+j)th group of interpolation motion parameters located after the current group of valid motion parameter in the interpolation parameter sequence arranged by time data from smallest to largest, a difference between position data in the (y+j)th group of interpolation motion parameters and position data in the current group of valid motion parameters is calculated in sequence until an end-point group of interpolation motion parameters is found. A difference between position data in the end-point group of interpolation motion parameters and the position data in the current group of valid motion parameters is larger than a preset threshold. "y" is the serial number of the current group of valid motion parameters in the interpolation parameter sequence, j=1, 2, 3 . . . k, k≤$N_{2-x}$, and $N_2$ is the total number of the groups of interpolation motion parameters in the interpolation parameter sequence. Step c: a group of interpolation motion parameters between the current group of valid motion parameters and the end-point group of interpolation motion parameters is deleted, the end-point group of interpolation motion parameters is reserved as a current group of valid motion parameters, and the step b is returned. Step d: all reserved groups of valid motion parameters are determined as a new interpolation parameter sequence.

According to an embodiment of the present invention, before calculating driving parameters of a motion component based on the interpolation parameter sequence (step S230), the method 200 may further include following steps. Whether a fourth reversing set exists in the interpolation parameter sequence is detected. Each fourth reversing set comprises two groups of interpolation motion parameters with adjacent time data and opposite speed data. If at least one fourth reversing set is detected, for each of the at least one fourth reversing set, at least one group of fourth reversing motion parameters is inserted into the fourth reversing set to obtain a new interpolation parameter sequence. Speed data in the group of fourth reversing motion parameters equals 0, and time data in the group of fourth reversing motion parameters is located between time data in two groups of interpolation motion parameters in the fourth reversing set into which the group of fourth reversing motion parameters is inserted.

The above has described the implementation of various optimization solutions, for example, performing the operations of backlash compensation, motion parameter optimization, opposite speed parameter interpolation, etc. on the rough interpolation parameter sequence before the second interpolation. Optionally, the above optimization solutions may also be performed on the interpolation parameter sequence. Those skilled in the art may appreciate the above three optimizations implementation performed on the interpolation parameter sequence with reference to the above description of the optimizations on the rough interpolation parameter sequence, which will not be described in detail herein.

Further, optionally, the above three optimization solutions may be implemented at least partially at the same time. For example, both optimization solutions of backlash compensation and motion parameter optimization may be performed on the rough interpolation parameter sequence.

Figure 7:
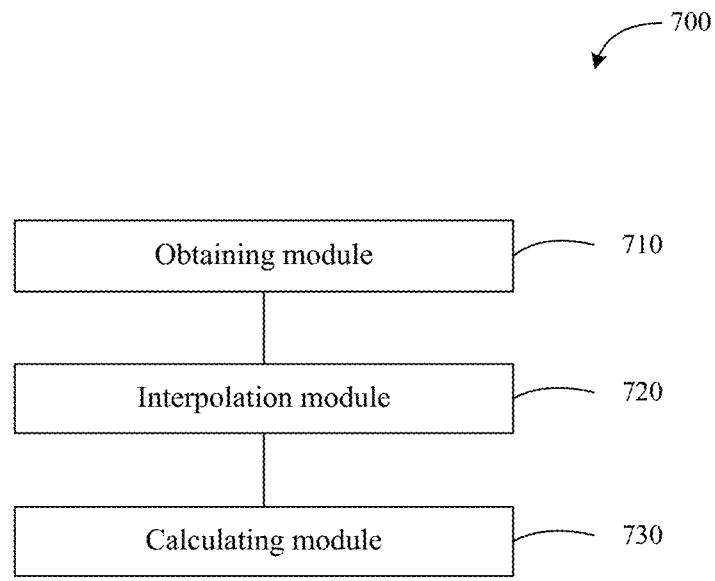
FIG. 7 shows a schematic block diagram of a motion control device according to an embodiment of the present invention.

According to another aspect of the present invention, a motion control device is provided. FIG. 7 shows a schematic block diagram of a motion control device 700 according to an embodiment of the present invention.

As shown in FIG. 7, the motion control device 700 according to the embodiment of the present invention includes an obtaining module 710, an interpolation module 720 and a calculating module 730. The various modules may separately perform the various steps/functions of the motion control method described above in conjunction with FIGS. 1-6. Only main functions of each module of the motion control device 700 are described below, and details that have been described above are omitted.

The obtaining module 710 is configured to obtain a sequence of motion parameters of a joint.

The interpolation module 720 is configured to interpolate the sequence of motion parameters to obtain an interpolation parameter sequence.

The calculating module 730 is configured to calculate driving parameters of a motion component based on the interpolation parameter sequence to drive the motion component to move.

Figure 8:
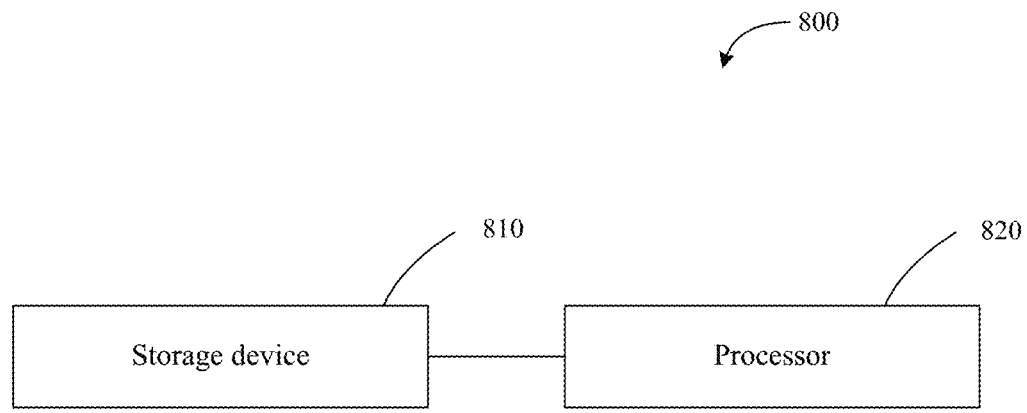
FIG. 8 shows a schematic block diagram of a motion control system according to an embodiment of the present invention.

FIG. 8 shows a schematic block diagram of a motion control system 800 according to an embodiment of the present invention. The motion control system 800 includes a storage device (that is, memory) 810 and a processor 820.

The storage device 810 stores computer program instructions for implementing corresponding steps in the motion control method according to the embodiments of the present invention.

The processor 820 is used for running the computer program instructions stored in the storage device 810 so as to perform the corresponding steps in the motion control method according to the embodiments of the present invention.

In an embodiment, the computer program instructions are configured to perform, when run by the processor 820, the following steps: obtaining a sequence of motion parameters of a joint; interpolating the sequence of motion parameters to obtain an interpolation parameter sequence; and calculating driving parameters of a motion component based on the interpolation parameter sequence to drive the motion component to move.

Illustratively, the processor 820 may include a robot control apparatus and a motion control component. The step of interpolating the sequence of motion parameters to obtain an interpolation parameter sequence, performed when the computer program instructions are run by the processor 820, may include: firstly interpolating the motion parameters to obtain a rough interpolation parameter sequence when the computer program instructions are executed by the robot control apparatus; and secondly interpolating the rough interpolation parameter sequence to obtain an interpolation parameter sequence when the computer program instructions are executed by the motion control component.

The motion control system 800 shown in FIG. 8 may use the identical or similar hardware structure and operation mode with the motion control system 100 shown in FIG. 1, and it may be understood with reference to the description above with respect to the motion control system 100.

In addition, according to yet another aspect of the present invention, a storage medium is provided. The storage medium stores program instructions, and when the program instructions are run by a computer or a processor, the computer or the processor executes corresponding steps of the motion control method in the embodiments of the present invention. The storage medium may include, for example, a storage component of a tablet computer, a hard disk of a personal computer, a read-only memory (ROM), an erasable programmable read-only memory (EPROM), a portable compact disc read-only memory (CD-ROM), and a USB memory, or any combination thereof. The computer-readable storage medium may be any combination of one or more computer-readable storage media.

Those of ordinary skill in the art will appreciate specific implementation solutions of the above motion control device and system and storage medium by reading the above related description of the motion control method, which will not be described in detail herein for brevity.

Although exemplary embodiments have been described herein with reference to the accompanying drawings, it is to be understood that the exemplary embodiments described above are merely exemplary and are not intended to limit the scope of the present invention thereto. Various changes and modifications may be made therein by those of ordinary skill in the art without departing from the scope and spirit of the present invention. All the changes and modifications are intended to be included within the scope of the present invention as claimed in the appended claims.

Those of ordinary skill in the art may appreciate that the units and algorithm steps of the examples described in conjunction with the embodiments disclosed herein can be implemented by electronic hardware, or a combination of computer software and electronic hardware. Whether these functions are executed by hardware or software depends on the specific application and design constraints of the technical solution. Those professional and skilled can use different methods to implement the described functions for each specific application, but such implementation should not be considered as going beyond the scope of the present invention.

In several embodiments provided in the disclosure, it should be understood that the disclosed devices and methods may be implemented in other ways. For example, the device embodiments described above are merely illustrative, for example, the division of the modules is merely a division of logical functions, and there may be other divisions in actual implementation, for example, a plurality of units or components may be combined or integrated into another device, or some features may be ignored or not implemented.

Numerous specific details are set forth in the description provided herein. However, it can be appreciated that the embodiments of the present invention can be practiced without these specific details. In some examples, well-known methods, structures and techniques are not shown in detail in order not to obscure the understanding of this specification.

Similarly, it is to be appreciated that in order to simplify the present invention and aid in understanding one or more of the various aspects of the inventive, in the description of the exemplary embodiments of the present invention, the various features of the present invention are sometimes grouped together into a single embodiment, figure, or description thereof. However, the method of the present invention should not to be interpreted as reflecting the intention that the claimed invention requires more features than those explicitly recited in each claim. More precisely, as reflected in the corresponding claims, the inventive points may lie in that the technical problems may be solved with the corresponding features less than all features of a single disclosed embodiment. Thus, the claims following the specific embodiments are explicitly incorporated into the specific embodiments, wherein each claim itself serves as a separate embodiment of the present invention.

Those skilled in the art will appreciate that all features disclosed in this specification (including the appended claims, abstract and drawings), and all processes or units of any method or devices, may be combined in any combination, except that there is mutual exclusion therebetween. Each feature disclosed in this description (including the appended claims, abstract and drawings) may be replaced by an alternative feature serving the same, equivalent or similar purpose, unless indicated clearly otherwise.

Furthermore, those skilled in the art can appreciate that while some embodiments described herein include certain features included in other embodiments but not others, combinations of features of different embodiments means to be within the scope of the present invention and to form different embodiments. For example, in the claims, any of the claimed embodiments may be used in any combination.

Various component embodiments of the present invention may be implemented by hardware, or by software modules running on one or more processors, or by a combination thereof. Those skilled in the art will appreciate that some or all functions of some modules in the motion control devices according to the embodiments of the present invention may be implemented in practice by a microprocessor or a digital signal processor (DSP). The present invention may also be implemented as a device program (for example, computer program and computer program product) for executing part or all of the methods described herein. Such a program for implementing the present invention may be stored on a computer-readable medium or may take the form of one or more signals. Such a signal may be downloaded from an Internet website, or provided by a carrier signal, or provided in any other form.

It should be noted that the above-described embodiments illustrate rather than limit the present invention and that alternative embodiments may be devised by those skilled in the art without departing from the scope of the appended claims. In the claims, any reference signs placed between parentheses shall not be construed as limiting the claims. The word "comprising" does not exclude the presence of elements or steps not listed in the claims. The word "a" or "an" preceding an element does not exclude the presence of a plurality of such elements. The present invention may be implemented by means of hardware including several different elements and by means of a suitably programmed computer. In the device claim enumerating several modules, several of the modules may be embodied in the same item of hardware. The use of words, "first", "second", "third", etc., does not indicate any order. These words may be interpreted as names.

The foregoing description, merely being specific embodiments of the present invention or descriptive of the specific embodiments, is not intended to limit the protection scope of the present invention. Any change or substitution, that may readily occur to those skilled in the art, within the technical scope disclosed in the present invention are intended to be encompassed within the protection scope of the present invention. The protection scope of the present invention shall be subject to the protection scope of the claims.

What is claimed is:

1. A motion control method, comprising:
   obtaining a sequence of motion parameters of a joint;
   interpolating the sequence of motion parameters to obtain an interpolation parameter sequence, comprising:
      firstly interpolating the sequence of motion parameters by using a robot control apparatus to obtain a rough interpolation parameter sequence;
      detecting whether a first reversing set exists in the rough interpolation parameter sequence, each first reversing set comprising three groups of rough interpolation motion parameters with adjacent time data for reversing the motion component;
      if at least one first reversing set is detected, for each of the at least one first reversing sets, inserting at least one group of first reversing motion parameters into the first reversing set to obtain a new rough interpolation parameter sequence, wherein the at least one group of first reversing motion parameters is used for indicating that a backlash is passed during reversal of the motion component within a preset time; and
      secondly interpolating the rough interpolation parameter sequence by using a motion control component to obtain the interpolation parameter sequence; and
   calculating driving parameters of a motion component based on the interpolation parameter sequence to drive the motion component to move.

2. The method according to claim 1, wherein each of the at least one first reversing sets comprises a first group of motion parameters (P1, V1, T1), a second group of motion parameters (P2, V2, T2) and a third group of motion parameters (P3, V3, T3) arranged by time data from smallest to largest, and an inserted group of first reversing motion parameters is (P4, V4, T4);
   if P2−P1>0 and P3−P2<0, then:
      P4=P2−360°/an encoder resolution,
      V4=a first preset speed, and
      T4=T2+a first preset time; and
   if P2−P1<0 and P3−P2>0, then:
      P4=P2+360°/the encoder resolution,
      V4=a second preset speed, and
      T4=T2+a second preset time; and
   wherein P1, P2, P3 and P4 are position data, V1, V2, V3 and V4 are speed data, and T1, T2, T3 and T4 are time data.

3. The method according to claim 1, wherein before secondly interpolating the rough interpolation parameter sequence by using a motion control component, the method further comprises:
  step a: reserving a first group of rough interpolation motion parameters, in the rough interpolation parameter sequence arranged by time data from smallest to largest, as a current group of valid motion parameters;
  step b: for an (x+i)th group of rough interpolation motion parameters located after the current group of valid motion parameters in the rough interpolation parameter sequence arranged by time data from smallest to largest, calculating a difference between position data in the (x+i)th group of rough interpolation motion parameters and position data in the current group of valid motion parameters in sequence until an end-point group of rough interpolation motion parameters is found, a difference between position data in the end-point group of rough interpolation motion parameters and the position data in the current group of valid motion parameters being larger than a preset threshold, wherein x is a serial number of the current group of valid motion parameters in the rough interpolation parameter sequence, i=1, 2, 3 . . . m, m≤$N_{1-x}$, and $N_1$ is the total number of groups of rough interpolation motion parameters in the rough interpolation parameter sequence;
  step c: deleting a group of rough interpolation motion parameters between the current group of valid motion parameters and the end-point group of rough interpolation motion parameters, reserving the end-point group of rough interpolation motion parameters as a current group of valid motion parameters, and returning to the step b; and
  step d: determining all reserved groups of valid motion parameters as a new rough interpolation parameter sequence.

4. The method according to claim 1, wherein before secondly interpolating the rough interpolation parameter sequence by using a motion control component, the method further comprises:
  detecting whether a second reversing set exists in the rough interpolation parameter sequence, each second reversing set comprising two groups of rough interpolation motion parameters with adjacent time data and opposite speed data; and
  if at least one second reversing set is detected, for each of the at least one second reversing sets, inserting at least one group of second reversing motion parameters into the second reversing set to obtain a new rough interpolation parameter sequence, wherein speed data in the group of second reversing motion parameters equals 0, and time data in the group of second reversing motion parameters is located between time data in two groups of rough interpolation motion parameters in the second reversing set into which the group of second reversing motion parameters is inserted.

5. The method according to claim 1, wherein the secondly interpolating the rough interpolation parameter sequence by using a motion control component to obtain the interpolation parameter sequence comprises:
  secondly interpolating the rough interpolation parameter sequence by using the motion control component to make the interpolation parameter sequence contain an interpolation motion parameter corresponding to each microstep of the motion component.

6. The method according to claim 1, wherein before calculating driving parameters of a motion component based on the interpolation parameter sequence, the method further comprises:
  detecting whether a third reversing set exists in the interpolation parameter sequence, each third reversing set comprising three groups of interpolation motion parameters with adjacent time data for reversing the motion component; and
  if at least one third reversing set is detected, for each of the at least one third reversing sets, inserting at least one group of third reversing motion parameters into the third reversing set to obtain a new interpolation parameter sequence, wherein the at least one group of third reversing motion parameters is used for indicating that a backlash is passed during reversal of the motion component within a preset time.

7. The method according to claim 1, wherein before calculating driving parameters of a motion component based on the interpolation parameter sequence, the method further comprises:
  step a: reserving a first group of interpolation motion parameters, in the interpolation parameter sequence arranged by time data from smallest to largest, as current group of valid motion parameters;
  step b: for a (y+j)th group of interpolation motion parameters located after the current group of valid motion parameters in the interpolation parameter sequence arranged by time data from smallest to largest, calculating a difference between position data in the (y+j)th group of interpolation motion parameters and position data in the current group of valid motion parameters in sequence until an end-point group of interpolation motion parameters is found, a difference between position data in the end-point group of interpolation motion parameters and the position data in the current group of valid motion parameters being larger than a preset threshold, wherein y is a serial number of the current group of valid motion parameters in the interpolation parameter sequence, j=1, 2, 3 . . . k, k≤$N_{2-x}$, and $N_2$ is the total number of groups of interpolation motion parameters in the interpolation parameter sequence;
  step c: deleting a group of interpolation motion parameters between the current group of valid motion parameters and the end-point group of interpolation motion parameters, reserving the end-point group of interpolation motion parameters as a current group of valid motion parameters, and returning to the step b; and
  step d: determining all reserved groups of valid motion parameters as a new interpolation parameter sequence.

8. The method according claim 1, wherein before calculating driving parameters of a motion component based on the interpolation parameter sequence, the method further comprises:
  detecting whether a fourth reversing set exists in the interpolation parameter sequence, each fourth reversing set comprising two groups of interpolation motion parameters with adjacent time data and opposite speed data; and
  if at least one fourth reversing set is detected, for each of the at least one fourth reversing sets, inserting at least one group of fourth reversing motion parameters into the fourth reversing set to obtain a new interpolation parameter sequence, wherein speed data in the group of fourth reversing motion parameters equals 0, and time data in the group of fourth reversing motion parameters is located between time data in two groups of interpolation motion parameters in the fourth reversing set into which the group of fourth reversing motion parameters is inserted.

9. The method according to claim 1, wherein the interpolating the sequence of motion parameters is achieved by using one or more of following interpolation modes: trapezoidal curve interpolation, S-shaped curve interpolation, cubic polynomial curve interpolation, quintic polynomial curve interpolation, and linear interpolation.

10. The method according to claim 1, wherein the motion control method further comprises:
receiving an interpolation instruction which is input by a user and is used for instructing an interpolation mode; and
the interpolating the sequence of motion parameters to obtain an interpolation parameter sequence comprises:
interpolating the sequence of motion parameters in the interpolation mode instructed by the interpolation instruction to obtain the interpolation parameter sequence.

11. The method according to claim 1, wherein calculating driving parameters of a motion component based on the interpolation parameter sequence is started when the number of groups in the interpolation parameter sequence reaches a preset number.

12. A motion control system, comprising a processor and a memory, wherein the memory stores computer program instructions which are configured to perform, when run by the processor, the motion control method according to claim 1.

13. A non-transitory storage medium storing program instructions which are configured to perform, when running, a motion control method with a sequence of motion parameters of a joint, the method comprising:
interpolating the sequence of motion parameters to obtain an interpolation parameter sequence, comprising:
firstly interpolating the sequence of motion parameters by using a robot control apparatus to obtain a rough interpolation parameter sequence;
detecting whether a first reversing set exists in the rough interpolation parameter sequence, each first reversing set comprising three groups of rough interpolation motion parameters with adjacent time data for reversing the motion component;
if at least one first reversing set is detected, for each of the at least one first reversing sets, inserting at least one group of first reversing motion parameters into the first reversing set to obtain a new rough interpolation parameter sequence, wherein the at least one group of first reversing motion parameters is used for indicating that a backlash is passed during reversal of the motion component within a preset time; and
secondly interpolating the rough interpolation parameter sequence by using a motion control component to obtain the interpolation parameter sequence; and
calculating driving parameters of a motion component based on the interpolation parameter sequence to drive the motion component to move.

14. The non-transitory storage medium of claim 13, wherein each of the at least one first reversing sets comprises a first group of motion parameters (P1, V1, T1), a second group of motion parameters (P2, V2, T2) and a third group of motion parameters (P3, V3, T3) arranged by time data from smallest to largest, and an inserted group of first reversing motion parameters is (P4, V4, T4);

if P2−P1>0 and P3−P2<0, then:
P4=P2−360°/an encoder resolution,
V4=a first preset speed, and
T4=T2+a first preset time; and
if P2−P1<0 and P3−P2>0, then:
P4=P2+360°/the encoder resolution,
V4=a second preset speed, and
T4=T2+a second preset time; and
wherein P1, P2, P3 and P4 are position data, V1, V2, V3 and V4 are speed data, and T1, T2, T3 and T4 are time data.

15. The non-transitory storage medium of claim 13, wherein the method further comprises:
step a: reserving a first group of rough interpolation motion parameters, in the rough interpolation parameter sequence arranged by time data from smallest to largest, as a current group of valid motion parameters;
step b: for an (x+i)th group of rough interpolation motion parameters located after the current group of valid motion parameters in the rough interpolation parameter sequence arranged by time data from smallest to largest, calculating a difference between position data in the (x+i)th group of rough interpolation motion parameters and position data in the current group of valid motion parameters in sequence until an end-point group of rough interpolation motion parameters is found, a difference between position data in the end-point group of rough interpolation motion parameters and the position data in the current group of valid motion parameters being larger than a preset threshold, wherein x is a serial number of the current group of valid motion parameters in the rough interpolation parameter sequence, i=1, 2, 3 . . . m, m≤$N_{1-x}$, and $N_1$ is the total number of groups of rough interpolation motion parameters in the rough interpolation parameter sequence;
step c: deleting a group of rough interpolation motion parameters between the current group of valid motion parameters and the end-point group of rough interpolation motion parameters, reserving the end-point group of rough interpolation motion parameters as a current group of valid motion parameters, and returning to the step b; and
step d: determining all reserved groups of valid motion parameters as a new rough interpolation parameter sequence.

16. The non-transitory storage medium of claim 13, wherein the method further comprises:
receiving an interpolation instruction which is input by a user and is used for instructing an interpolation mode; and
the interpolating the sequence of motion parameters to obtain an interpolation parameter sequence comprises:
interpolating the sequence of motion parameters in the interpolation mode instructed by the interpolation instruction to obtain the interpolation parameter sequence.

17. A non-transitory storage medium storing program instructions which are configured to perform, when running, a motion control method with a sequence of motion parameters of a joint, the method comprising:
interpolating the sequence of motion parameters to obtain an interpolation parameter sequence;
detecting whether a first reversing set exists in the interpolation parameter sequence, each first reversing set comprising three groups of interpolation motion parameters with adjacent time data for reversing the motion component;

if at least one first reversing set is detected, for each of the at least one first reversing sets, inserting at least one group of first reversing motion parameters into the first reversing set to obtain a new interpolation parameter sequence, wherein the at least one group of first reversing motion parameters is used for indicating that a backlash is passed during reversal of the motion component within a preset time; and calculating driving parameters of a motion component based on the interpolation parameter sequence to drive the motion component to move.

18. The non-transitory storage medium of claim 17, wherein the method further comprises:
   step a: reserving a first group of rough interpolation motion parameters, in the rough interpolation parameter sequence arranged by time data from smallest to largest, as a current group of valid motion parameters;
   step b: for an (x+i)th group of rough interpolation motion parameters located after the current group of valid motion parameters in the rough interpolation parameter sequence arranged by time data from smallest to largest, calculating a difference between position data in the (x+i)th group of rough interpolation motion parameters and position data in the current group of valid motion parameters in sequence until an end-point group of rough interpolation motion parameters is found, a difference between position data in the end-point group of rough interpolation motion parameters and the position data in the current group of valid motion parameters being larger than a preset threshold, wherein x is a serial number of the current group of valid motion parameters in the rough interpolation parameter sequence, i=1, 2, 3 . . . m, m≤$N_{1-x}$, and $N_1$ is the total number of groups of rough interpolation motion parameters in the rough interpolation parameter sequence;
   step c: deleting a group of rough interpolation motion parameters between the current group of valid motion parameters and the end-point group of rough interpolation motion parameters, reserving the end-point group of rough interpolation motion parameters as a current group of valid motion parameters, and returning to the step b; and
   step d: determining all reserved groups of valid motion parameters as a new rough interpolation parameter sequence.

19. The non-transitory storage medium of claim 17, wherein the method further comprises:
   receiving an interpolation instruction which is input by a user and is used for instructing an interpolation mode; and
   the interpolating the sequence of motion parameters to obtain an interpolation parameter sequence comprises:
      interpolating the sequence of motion parameters in the interpolation mode instructed by the interpolation instruction to obtain the interpolation parameter sequence.

20. The non-transitory storage medium of claim 17, wherein the interpolating the sequence of motion parameters is achieved by using one or more of following interpolation modes: trapezoidal curve interpolation, S-shaped curve interpolation, cubic polynomial curve interpolation, quintic polynomial curve interpolation, and linear interpolation.

* * * * *